United States Patent
Hassan et al.

(10) Patent No.: US 10,757,712 B2
(45) Date of Patent: Aug. 25, 2020

(54) RESTRICTED FREQUENCY BAND INTERFERENCE CANCELLATION

(71) Applicant: Microsoft Technology Licensing, LLC, Redmond, WA (US)

(72) Inventors: Amer Hassan, Kirkland, WA (US); Jeffrey Yan, Singapore (SG); Todd Haugen, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 324 days.

(21) Appl. No.: 15/050,272

(22) Filed: Feb. 22, 2016

(65) Prior Publication Data

US 2017/0245284 A1 Aug. 24, 2017

(51) Int. Cl.
*H04W 72/08* (2009.01)
*H04B 15/02* (2006.01)
*H04W 16/14* (2009.01)

(52) U.S. Cl.
CPC .......... *H04W 72/082* (2013.01); *H04B 15/02* (2013.01); *H04W 16/14* (2013.01)

(58) Field of Classification Search
CPC . H04W 72/08; H04W 72/082; H04W 72/085; H04W 72/087; H04W 16/14; H04B 15/02
See application file for complete search history.

(56) References Cited

U.S. PATENT DOCUMENTS 6,304,618 B1 10/2001 Hafeez et al.
6,314,147 B1 11/2001 Liang et al.
(Continued)

FOREIGN PATENT DOCUMENTS

WO 2014036025 A1 3/2014
WO 2014155037 A1 10/2014
(Continued)

OTHER PUBLICATIONS

"International Search Report and Written Opinion Issued in PCT Application No. PCT/US2017/017845", dated May 24, 2017, 10 Pages.
(Continued)

*Primary Examiner* — Habte Mered
(74) *Attorney, Agent, or Firm* — Ray Quinney & Nebeker P.C; James Bullough

(57) ABSTRACT

A method and apparatus is disclosed by which a device in a wireless network may determine and reduce interference when using channels in restricted frequency bands and when other networks may be transmitting in the same restricted frequency. The wireless network may be a Wi-Fi system utilizing channels/frequencies in the television white space. Receivers, such as a client device and access point (AP), may determine information on one or more interfering signals and utilize the information to reduce or cancel the interference caused by the interfering signals generated by a second network. The information may be parameters or information on the structure of the interfering signal, and may be determined by retrieving stored cache information, receiving information on a beacon signal or sampling an interfering signal. The interference cancellation may be performed by joint demodulation or parallel interference cancellation.

17 Claims, 5 Drawing Sheets

(56) References Cited

U.S. PATENT DOCUMENTS

| | | | |
|---|---|---|---|
| 6,377,636 B1* | 4/2002 | Paulraj | H04B 7/0842 370/342 |
| 8,437,790 B1 | 5/2013 | Hassan et al. | |
| 9,769,774 B2* | 9/2017 | Kim | H04W 52/54 |
| 2003/0118131 A1 | 6/2003 | Kobylinski et al. | |
| 2005/0277400 A1* | 12/2005 | Shah | H04B 1/7107 455/284 |
| 2008/0248773 A1* | 10/2008 | De Carvalho | H04B 7/0854 455/278.1 |
| 2009/0100491 A1 | 4/2009 | Rijssemus et al. | |
| 2010/0238902 A1 | 9/2010 | Ji et al. | |
| 2010/0255794 A1* | 10/2010 | Agnew | H04W 16/14 455/77 |
| 2010/0309861 A1* | 12/2010 | Gorokhov | H04B 1/7103 370/329 |
| 2010/0330919 A1* | 12/2010 | Gurney | H04W 52/367 455/67.11 |
| 2011/0183632 A1* | 7/2011 | Suumaki | H04W 72/1231 455/77 |
| 2012/0189083 A1* | 7/2012 | Reial | H04B 1/1027 375/340 |
| 2013/0309975 A1 | 11/2013 | Kpodzo et al. | |
| 2015/0078212 A1* | 3/2015 | Buckley | H04W 72/1226 370/277 |
| 2015/0271682 A1 | 9/2015 | Wu et al. | |
| 2016/0036541 A1* | 2/2016 | Siomina | H04W 24/10 455/422.1 |
| 2016/0050690 A1* | 2/2016 | Yun | H04W 72/1226 370/329 |
| 2017/0280465 A1* | 9/2017 | Ahmad | H04W 72/082 |

FOREIGN PATENT DOCUMENTS

| | | |
|---|---|---|
| WO | 2015002696 A1 | 1/2015 |
| WO | 2015161005 A1 | 10/2015 |

OTHER PUBLICATIONS

Peng, et al., "Geo-location Database based TV White Space for Interference Mitigation in LTE Femtocell Networks", In Proceedings of IEEE 14th International Symposium and Workshops on a World of Wireless, Mobile and Multimedia Networks, Jun. 4, 2013, 6 pages.

* cited by examiner

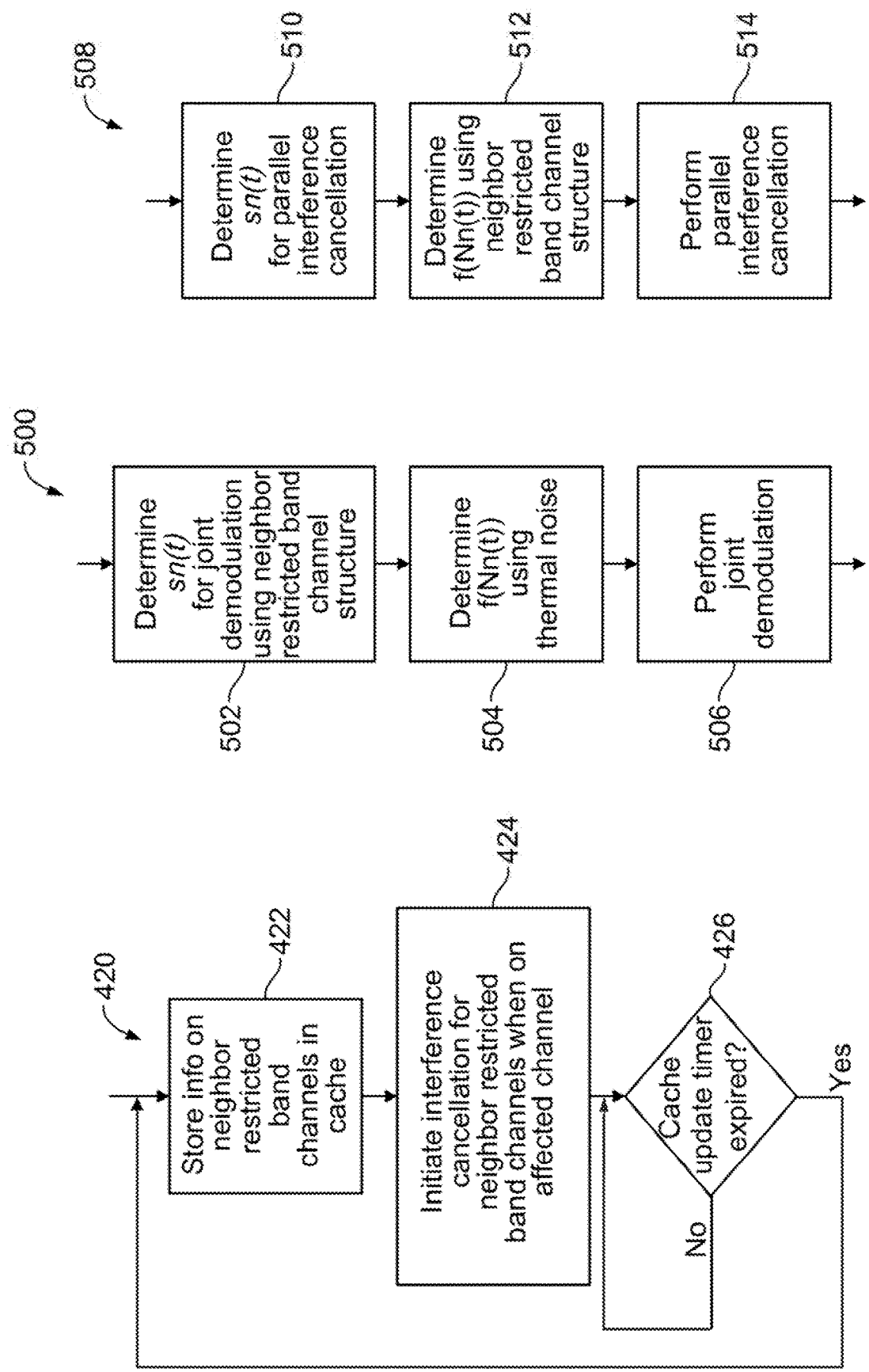

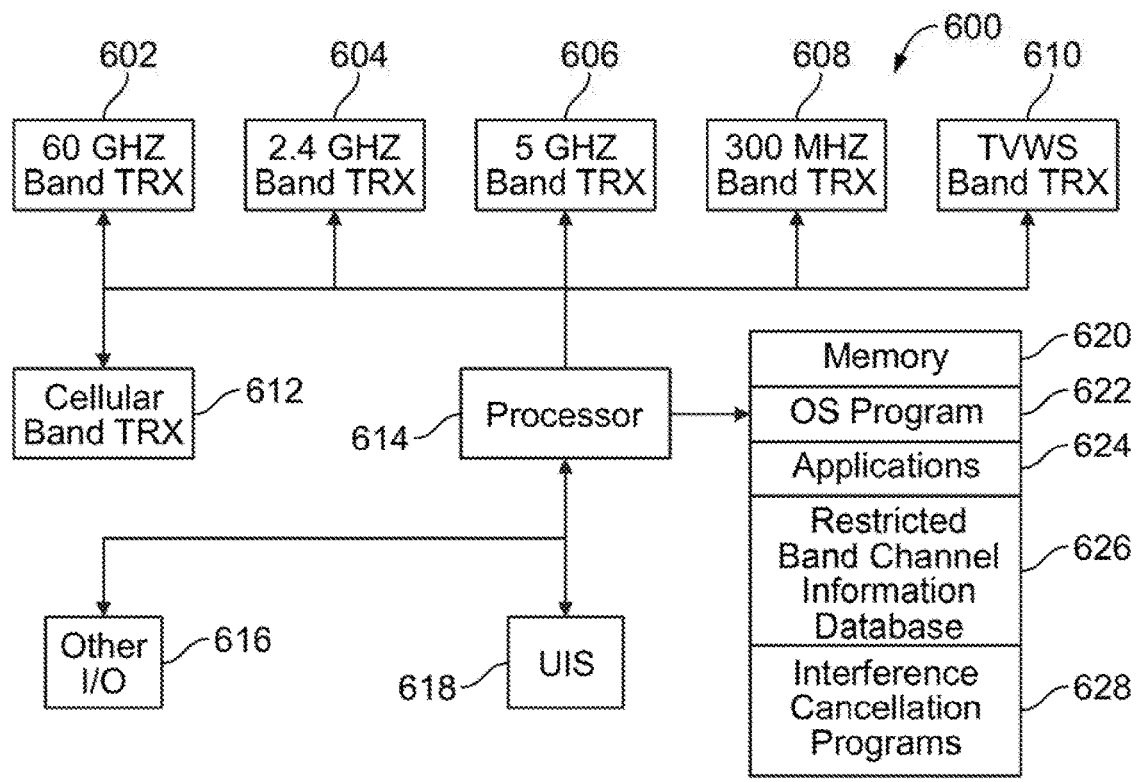
FIG. 6
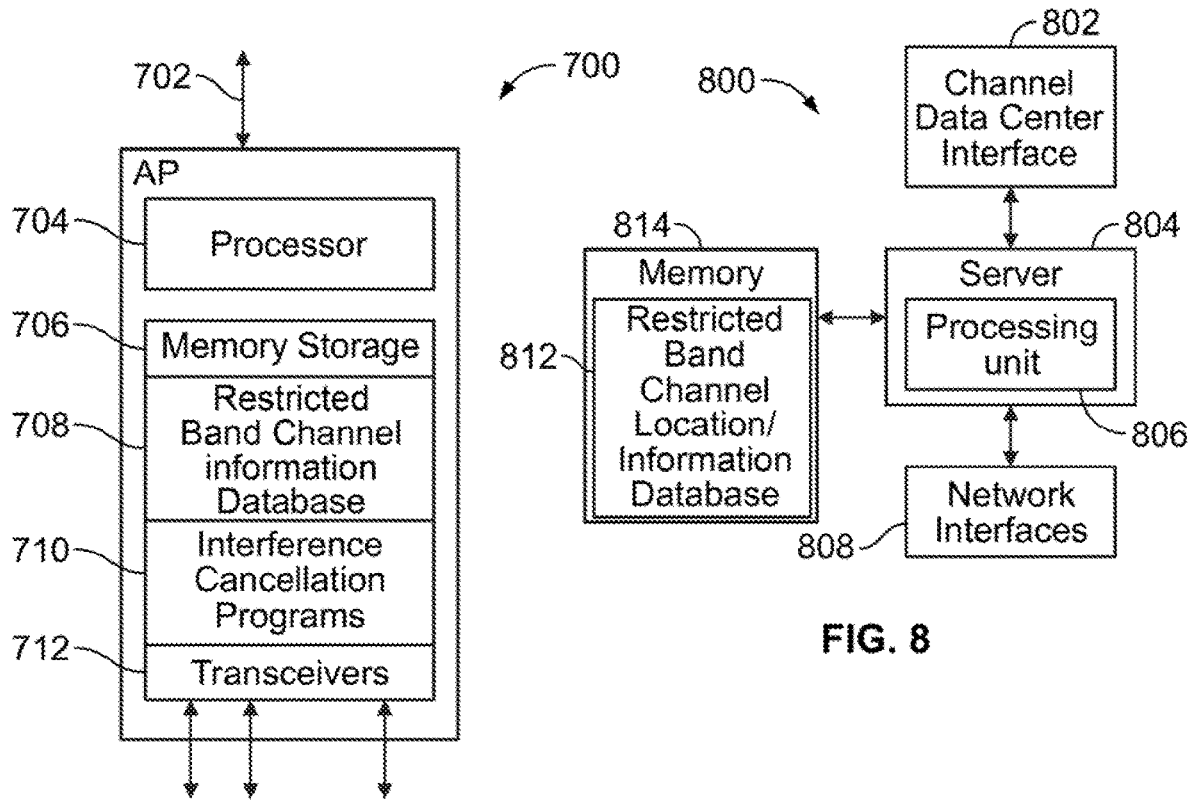
FIG. 7
FIG. 8

RESTRICTED FREQUENCY BAND INTERFERENCE CANCELLATION

BACKGROUND

Because of the growth of wireless communications, efforts have been made to increase the amount of wireless frequency spectrum that wireless networks are allowed to use through frequency sharing with incumbent wireless networks. For example, government organizations have recently permitted unlicensed systems broadcasters in their areas of jurisdiction to use portions of wireless spectrum that are officially licensed to television broadcasters in what is called the Television White Space (TVWS). TVWS is defined as unused frequency bands within frequency spectrum licensed for television use. In some geographic regions TVWS also includes frequency spectrum that is registered for use with wireless microphones. The frequency spectrum licensed for television broadcast use is a restricted frequency band but other wireless communications systems may utilize radio channels on available frequencies in the TVWS as long as certain restrictions are observed, such as protections for digital TV receiver signals from interference. The TVWS frequencies/channels permitted to be used are normally ones on which television stations are not currently transmitting. Restrictions may define which TVWS frequencies/channels are permitted for use in a certain geographic area and define a time period during which the frequencies may be used until the restrictions are updated. A wireless network using TVWS spectrum must observe the restrictions as they are updated. For example, most countries maintain one or more TVWS databases associated with a geographic area and maintain the TVWS database to have knowledge of frequencies/channels currently used by television stations in that area. If the operator of a wireless network desires to utilize TVWS spectrum in network operation, the wireless network must periodically check the TVWS database associated with its geographic area/government organization and determine which frequencies/channels it may use for a given time period.

Situations may exist in which the use of TVWS spectrum creates potential interference problems. For example, even though the frequency spectrum licensed for television broadcast use is restricted, a TVWS database responsible for a certain area, such as a country, may not have knowledge of frequency or channels in its TVWS that are being used by one or more television stations outside its area of jurisdiction. For example, a TVWS database of one country may be associated with an area that is near or adjacent to a jurisdictional or international border. In this case television stations beyond the border may cause interference in a wireless network using channels in the TVWS even though the wireless network was given permission to use the frequencies by the TVWS database. Another example of potential interference when using TVWS spectrum is when a wireless network (of multiple wireless networks that are within adjacent or overlapping areas) has queried a TVWS database and begun using channels in the TVWS as permitted by the TVWS database. Since the TVWS database only informs the wireless network of the available TVWS the wireless network may use as regards nonuse by television broadcasters, the wireless network observing the permitted use of the TVWS may be interfered with by the other multiple wireless networks also using the same TVWS spectrum as permitted by the TVWS database. Furthermore, interference affecting TVWS devices in a wireless network can have a cumulative effect because TV stations transmit continuous RF signals.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus that provide interference cancellation in a wireless network when using channels within restricted frequency bands are disclosed herein. In an embodiment, a device may determine that a first channel is to be used when operating in a network where the first channel has a frequency bandwidth within a portion of a restricted frequency band. The device then determines a parameter or parameters that are associated with at least one second channel that has a frequency in the restricted frequency band and where the at least one second channel is used by one or more second networks. The device may initiate interference cancellation based at least on the parameter, or parameters, to reduce interference caused by the one or more second networks that use the at least one second channel. The first channel and at least one second channel may or may not be on the same channel frequency. For example, the first channel and the at least one second channel may be channels that are both located on the same channel number or that are overlapping in the same channel frequency band, and the at least one second channel may cause co-channel interference on the first channel. Additionally, the first channel and the at least one second channel may be channels that are adjacent to one another in the restricted frequency band, where the at least one second channel causes adjacent channel interference to the first channel.

In implementations the device may determine parameters associated with the interfering at least one second channel by accessing a database that includes information on the at least one second channel as used by the one or more second networks and determine the parameter or parameters from the information accessed from the database. The information on the at least one second channel may be information on channel parameters or other parameters associated with channel structure of the interfering signal.

In one implementation, the device may access the database by receiving the information on the at least one second channel from the first network on a beacon signal. In another implementation the device may access the database by retrieving the information on the at least one second channel from a memory on the device, where the information was stored in the memory prior to the device initiating communications with the first network, for example during device manufacture, during device activation by a service provider or during device activation by a network manager. In other implementations the device may determine the parameters by sampling the at least one second channel and estimating the parameter or parameters from the sampling. Based on the parameters, the device may initiate interference cancellation by joint demodulation using a desired received signal of the first channel plus a sum of the interfering signals on the at least one second channel generated by the one or more second networks. In another example implementation, the device may initiate interference cancellation by parallel interference cancellation at the device using a desired signal of the first channel and a noise function that depends on the at least one interfering signal from the one or more second networks.

A further example implementation may be implemented in a client device and/or an access point (AP) of a Wi-Fi network operable to use television white space (TVWS) frequency spectrum upon the Wi-Fi network receiving an indication of the availability of the TVWS spectrum from a TVWS database. In this example implementation, a Wi-Fi client device that is receiving a signal on a Wi-Fi channel using a frequency within a television white space (TVWS) frequency spectrum may be operable to perform interference cancellation according to the embodiments to reduce interference caused by one or more other networks also using channels within the TVWS spectrum.

The example implementations may include creating and maintaining a database for a first network that includes information about channel parameters and parameters associated with channel structures that may be used in a restricted frequency band by one or more neighboring second networks. The database may be configured within infrastructure entities of the first network, for example, at a server or at one or more network access devices in the first network. The database may also be configured in one or more mobile devices operable in the first network, or the database may be configured within, or in association with, a TVWS database. The database may be accessed as necessary by a receiving device, such as a network access device, mobile device, or other network entity, that is determining channel parameters and channel structures for use in interference cancellation when receiving in a restricted frequency band. Changing conditions in the network may be accounted for by updating the database as necessary.

BRIEF DESCRIPTION OF THE DRAWINGS

FIG. 4C is a flow diagram illustrating operations performed by a receiving device in further example implementation;

FIG. 5A is a flow diagram illustrating example operations for interference cancellation by joint demodulation;

FIG. 5B is a flow diagram illustrating example operations for interference cancellation by parallel interference cancellation;

FIG. 6 is a simplified block diagram of an example implementation of a wireless device;

FIG. 7 is a simplified block diagram of an example implementation of a network access device; and FIG. 8 is a simplified block diagram of an example implementation of a network server device.

DETAILED DESCRIPTION

The system, method and apparatus will now be described by use of example embodiments. The example embodiments are presented in this disclosure for illustrative purposes, and not intended to be restrictive or limiting on the scope of the disclosure or the claims presented herein.

The disclosed embodiments provide a technical advantage in that the amount of interference in a wireless network may be reduced when devices in the wireless network communicate over portions of restricted frequency bands according to guidelines, or access information, given by an authority with responsibility for managing the restricted frequency bands. Interference in the wireless network caused by interfering systems unknown and outside the jurisdiction of the authority that are using the same portions of the restricted frequency bands may be reduced. Also interference in the wireless network caused by other wireless networks or systems also using the same portions of the restricted frequency bands under the guidelines of the authority may be reduced. The restricted frequency band may be any frequency band on which certain networks have priority of use, by license or otherwise, but that may be made available to other networks by permission of an entity that manages the restricted frequency spectrum. The entity may be an authority such as, for example, the United States Federal Communications Commission (FCC) or similar authority of another country or union of countries.

Implementations of the embodiments provide an advantage in that both adjacent channel interference and co-channel interference may be reduced in devices of a first network receiving transmissions on a first channel in a restricted band, where the transmissions are being interfered with by at least one second channel of one or more second networks. Interference may be reduced when the first channel and the at least one second channel are on the same channel frequency, and when the first channel and at least one second channel are on different frequencies. For example, interference may be reduced when the first channel and the at least one second channel are both located on the same channel number or are overlapping in the channel frequency band, and the at least one second channel causes co-channel interference on the first channel. Interference may also be reduced when the first channel and the at least one second channel are adjacent to one another in the restricted frequency band, and the at least one second channel causes adjacent channel interference to the first channel. The implementations also have application to reduce interference when the at least one second channel includes channels that cause both co-channel and adjacent channel interference on the first channel in the restricted frequency band.

Figure 1:
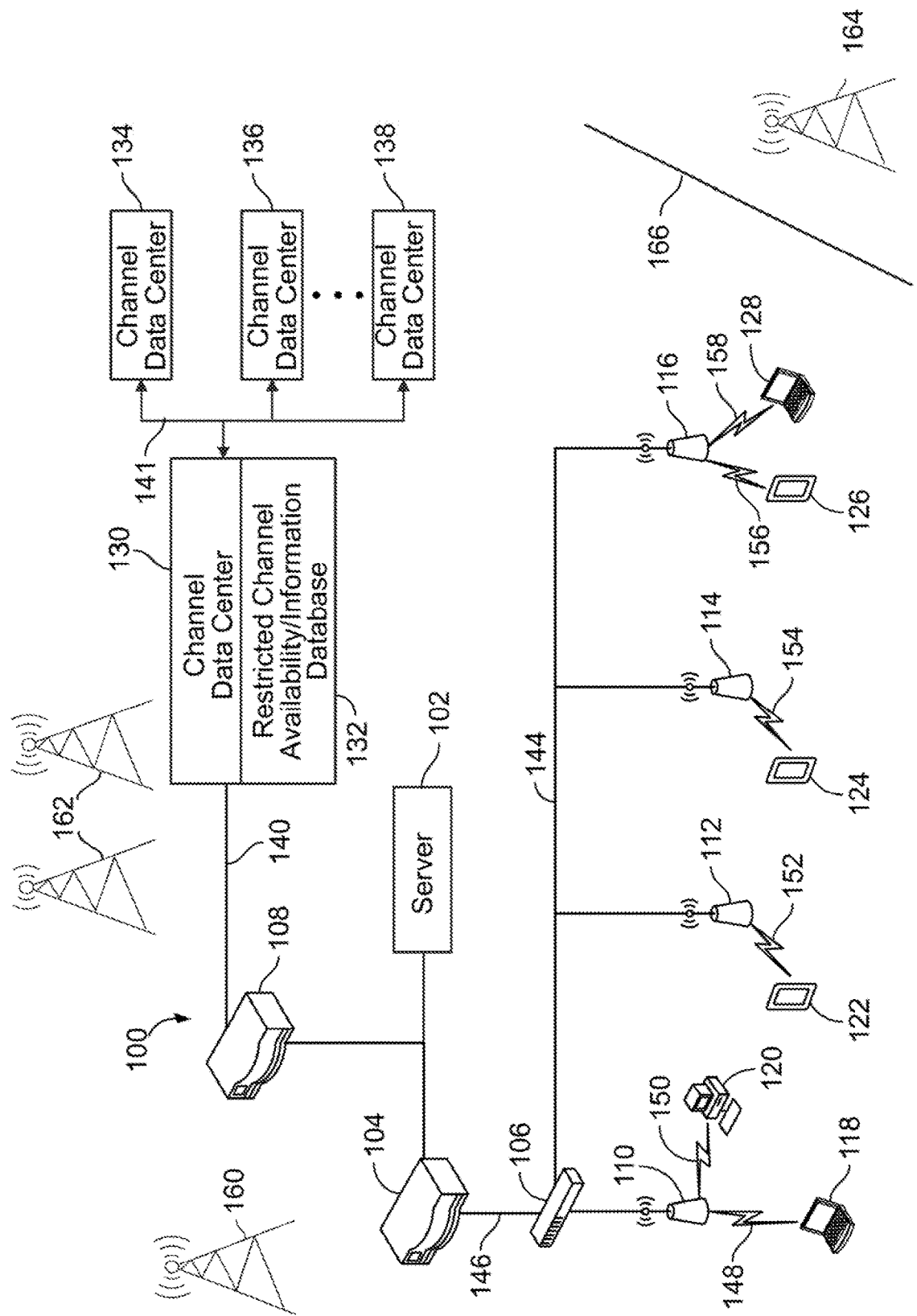
FIG. 1 is a simplified diagram showing a wireless network according to an example implementation of the embodiments.

Implementations of the disclosed embodiments provide a technical advantage over existing methods of using restricted frequency bands. For example, in a situation in which a first wireless network is permitted to use channels in the television white space (TVWS) that are determined by accessing a TVWS database managed by an authority governing wireless frequency spectrum in the area of the first wireless network, the implementations may be utilized in devices receiving on TVWS channels used by the first network to reduce interference. For example, the implementations have application in the case in which a governing authority managing a TVWS database does not have knowledge that frequencies or channels within its TVWS band are also being used by one or more television stations outside its area of jurisdiction. Even though a TVWS database may indicate certain TVWS channels are available because they are not used by television stations with the jurisdiction of the TVWS database they may be used by television station not in the jurisdictional area of the TVWS database but close enough to interfere with networks in the jurisdictional area. For example, when a governing entity managing a TVWS database of one country is associated with an area that is near or adjacent to a jurisdictional or international border, the implementations may be utilized to reduce interference caused by television stations beyond the border that are causing interference in a wireless network within the border using channels in the TVWS under the permission of the governing body. The implementations also provide a technical advantage when multiple wireless networks that are within adjacent or overlapping areas have queried a TVWS database and begun using channels in the TVWS as permitted by the TVWS database. Since the TVWS database only informs each of the wireless networks of the available TVWS bands the wireless networks may use based on nonuse by television broadcasters, the multiple wireless networks observing the permitted use of the TVWS may be interfering with each other. Implementing the restricted band interference cancellation of the embodiments in one or more networks of the multiple networks may reduce interference on TVWS band channels in the one or more networks in which it is implemented Referring now to FIG. 1, therein is a simplified diagram showing a wireless network according to an example implementation of the embodiments. The system includes wireless network 100, which may be, for example, a local area network (WLAN). Network 100 includes router 108, access point/gateway 104, server 102, switch 106, and access points, 110, 112, 114, and 116. Router 108, access point/gateway 104, network controller 102, and switch 106 may be configured to provide traffic routing and switching functions for traffic to and from the access points 110, 112, 114 and 116 over the infrastructure. Devices of network 100 may also communicate with channel data center 130 which may be located, for example, in the cloud and accessible over the internet. Wireless devices 118-128 are shown operating within the coverage area of network 100 and communicating with a nearby network access device, 110, 112, 114 or 116 over communication links 148-158. FIG. 1 also shows neighboring network 160, network 162, and networks 164, each of which may be located close enough to network 100 so that radio transmissions generated in network 160, 162, or network 164 may reach the area of network 100 and cause interference. In the example implementation of FIG. 1, network 160 may be another WLAN or cellular system, network 162 may represent one or more television broadcast networks, and network 164 may be a television broadcast network. Network 164 may be located in a different country or in the area of jurisdiction of a different radio frequency spectrum or telecommunications authority than network 100 as illustrated by the location of border 166. The telecommunications authority responsible for networks 100, 160 and 162 may have no authority or association with network 164. For example, network 100 and network 164 may be located in different countries. In FIG. 1 the one or more television broadcast networks 162 may transmit broadcasts in a restricted frequency band for which the television broadcast networks are licensed and for which the television broadcasts have priority of use. From time to time the television broadcast networks 162 may not use all available frequency spectrum in the restricted frequency band, and portions of the spectrum may be available for use by devices in network 100 or network 162. In an implementation the available portions of the spectrum may be TVWS spectrum. Devices within network 100 may communicate with data center 130 to obtain information on available frequency spectrum in the TVWS frequency band that may be used. Data center 130 may be managed by an entity with authority to decide and allow networks and devices in the area of network 100 and 160 to use the available restricted frequency band TVWS portions.

In the example of FIG. 1, when wireless devices 118-128 and device access points 110-116 are utilizing channels in TVWS of the restricted frequency band, even though network 100 has received information from channel data center 130 that the restricted channel frequencies are available and not used by television broadcast networks 162, and that network 100 is permitted to use the restricted channel frequencies, interference may still occur within network 100 that affects transmissions received on channels in the currently used restricted frequency band TVWS. For example, interference may be generated by network 164 that affects network 100. That is because network 164 may be generating television broadcasts in the same television broadcast frequency ranges as used by networks 162, but the portions of frequency spectrum used by network 164 are not known to data center 130 and not considered when allowing network 100 to use the restricted channels in the TVWS. Also, because channel data center 130 may indicate the availability of the same channels in the restricted frequency band TVWS portion to both of network 100 and network 160, transmissions generated in network 160 may interfere with transmission in network 100 in the restricted frequency band TVWS. The same scenario may be possible for other restricted frequency bands.

In the example implementation of FIG. 1, wireless devices 118-128 and device access points 110-116 may be configured to operate using channels having frequencies in a restricted frequency band when one or more portions of the restricted frequency band are available for use in network 100. Wireless devices 118-128 and device access points 110-116 may also be configured to implement restricted frequency band interference cancellation according to embodiments of this disclosure when receiving transmissions on an available channel in a restricted frequency band such as the TVWS spectrum.

While wireless devices 118-128 are each shown in FIG. 1 as implemented as one of an example smart phone, a tablet computer, a desktop computer, or laptop computer device, each of the example wireless devices 118-128 may be alternatively implemented as any other type of device, or number of devices, that may be configured with functionality supporting the embodiments disclosed herein. These other types of devices may include, for example, gaming devices, media devices, smart televisions, home theater systems, smart automobile systems, smart house systems, multimedia cable/television boxes, smart phone accessory devices, tablet accessory devices, personal digital assistants (PDAs), portable media players, smart watches, smart sensors, or industrial control systems.

In an example implementation, network 100 may comprise a Wi-Fi network that operates over a range of frequencies on communication links 148-158 according to IEEE 802.11 standards specifications. The frequency range may include frequency bands in the range of 300 MHz to 90 GHz, each according to the 802.11 specification for the particular frequency band. The access points 110-116 may be capable of communicating on channels of various bandwidths within the frequency ranges according to the standard being used for the communications. The access points 110-116 may also include transceivers operating in the 300 MHz television broadcast range using TVWS bands. In alternative implementations, network 100 may also operate over any other electromagnetic frequencies, including optical wavelengths, or communication medium, and may include transceivers according to any other standards specifications, including any non-802.11 packet/framing protocols Wireless devices 118-128 may each also be operable as a Wi-Fi client device to communicate with the network access points 110-116 according to one or more of the IEEE 802.11 standards specifications on which the access point operates. Client devices 118-128 may each include one or more applications that communicate data traffic with one of network access devices 110-116 when in the coverage area of network 100. These applications may include any type of application communicating over network 100, such as client applications communicating with a client application on another device in network 100, or in another network, applications included in the device operating system, applications installed or downloaded to the wireless device 116 by a user, or any other type of function that communicates through network 100.

Figure 2:
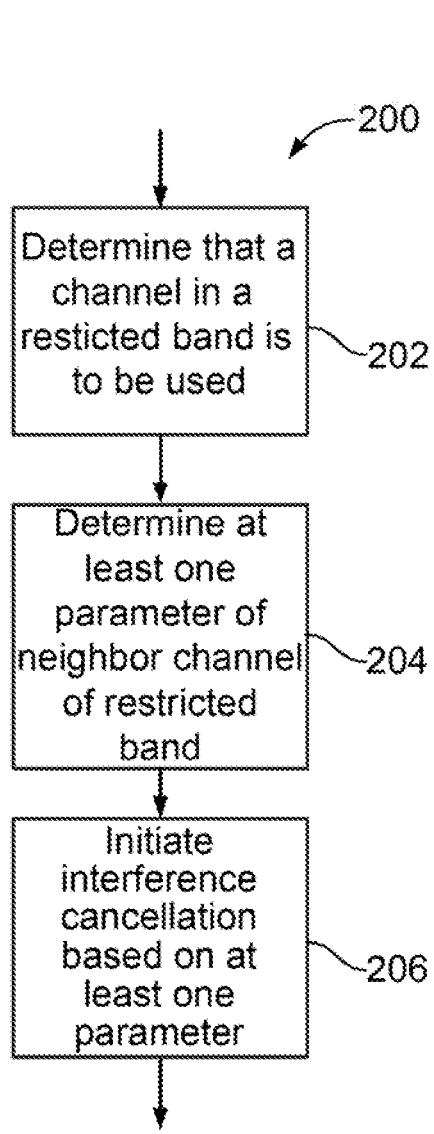
FIG. 2 is a flow diagram illustrating operations performed in an example network access device or wireless device according to an example implementation.

Referring now to FIG. 2, therein is a flow diagram 200 illustrating operations performed in a device according to an example implementation of the embodiments. The process of FIG. 2 may be performed in any receiving device in a network, such as wireless devices 118-128 and network access devices 110-116 of network 100, when the receiving device is receiving transmissions on channels having frequencies in a restricted frequency band such as the TVWS band.

The process begins at 202 where it is determined that a first channel in a restricted frequency band is to be used to receive transmissions sent to the receiving device. The first channel may be a channel in a restricted band that is indicated to the network in which the receiving device operates as currently unused and available for use. The determination at 202 may be performed based on comparing a channel identifier or parameter associated with a first channel on which the device is to receive, for example channel number, channel frequency, or any other identifier with appropriate information indicating the first channel is in a restricted frequency band. The device may perform the determination by accessing a database including information identifying channels as being in a restricted band. The determination that the first channel is in a restricted frequency band may also be performed by checking a data field included with other channel information, for example a bit added to channel identifying or assignment information that is set to indicate the first channel is restricted. In another implementation where a wireless device is the receiving device, an indication that the first channel is in a restricted frequency band may be included in channel information sent from a network access device to a wireless device, for example in a beacon signal or with a channel assignment message.

At 204 at least one parameter of at least one second channel, where each at least one second channel is a neighbor channel, i.e., a channel of a neighboring network, in the restricted frequency band in which the first channel falls is determined. The at least one second channel may be associated with the channel frequency of the first channel by either being on the same channel frequency, or being on a frequency that has been determined to cause interference to the first channel on which the device is to receive. The at least one parameter determined at 204 may be determined by accessing a database that includes information on channels in the restricted frequency band and determining the at least one parameter of the at least one second channel using the first channel identity to identify second channels that may interfere. In an implementation, the neighbor channels may be channels of neighboring networks, such as network 164, of FIG. 1 that are using channels in the restricted frequency band independent and/or outside the jurisdiction of the entity which has allowed the first channel to be used. Alternately the neighbor channels may be channels of neighbor networks, such as network 160, that are restricted as to use of the restricted frequency band according to the same restrictions as apply to network 100. Network 160 may receive indications of the same available restricted band channels as network 100 and use the same channels, but in an uncoordinated way so interference may occur.

The at least one parameter determined at 204 may be any parameter or information that the receiving device may utilize in reducing or cancelling interference on the first channel that is caused by transmissions on the at least one second channel. In one implementation the parameter may be information describing a channel structure of the at least one second channel.

Next, at 206, the receiving device initiates interference cancellation based on the at least one parameter determined at 204. The interference cancellation may be performed, for example, by joint demodulation or by parallel interference cancellation based on the channel structure of the at least one second channel.

Figure 3:
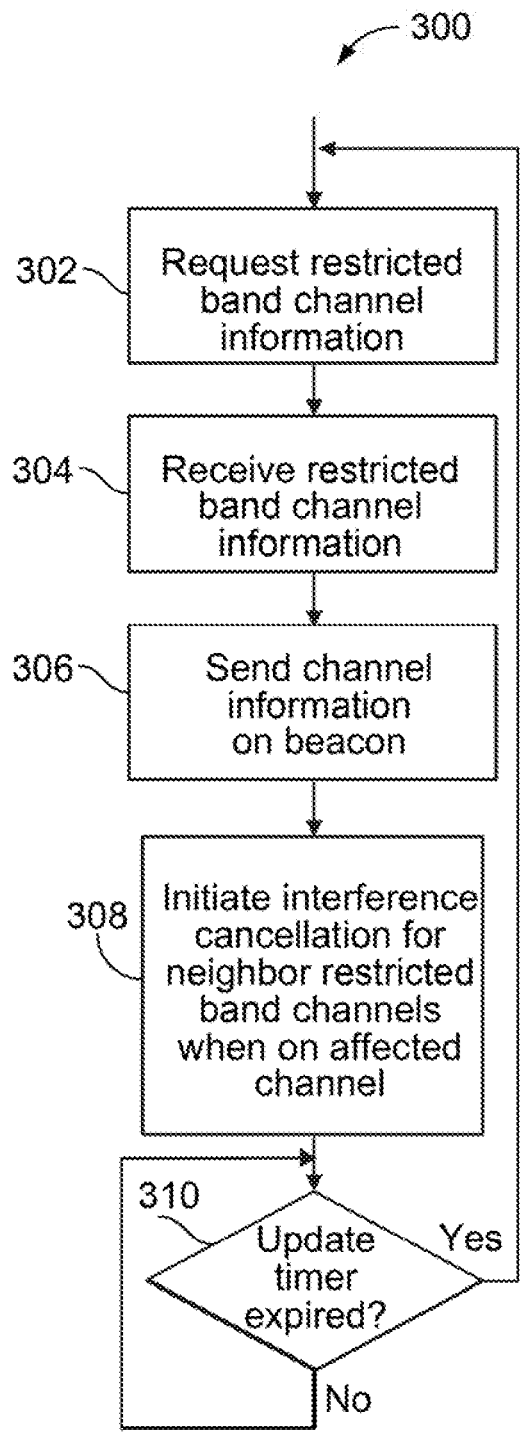
FIG. 3 is a flow diagram illustrating operations performed by an example network access device in the implementation of FIG. 2.

Referring now to FIG. 3, therein is a flow diagram 300 illustrating operations performed in a network according to an example implementation of the operations of FIG. 2. In an example implementation, network infrastructure, such as server 102, and/or network access devices 110-116 of network 100 may be configured with appropriate processors or circuitry, and program code to perform the operations of FIG. 3.

The process begins at 302 where a control point of network 100, such as server 102 requests restricted band channel information. The restricted band channel information may comprise information about channels having frequencies in a restricted frequency band used by networks neighboring network 100, for example, network 160 or network 164. The channel information may comprise information on the channel structures of restricted band channels. The channel information may be requested from a data base, which may be incorporated in channel data center 130, or which may be implemented elsewhere. In one example implementation, the device requesting the restricted channel band information may request restricted band channel information that is specifically related to restricted band channels that network 100 is currently or will be using. For example, the requesting device may identify a first restricted band channel or channels that network 100 is currently or will be using and the database may return information on particular channels of neighbor networks that may interfere with the first restricted band channel or channels. In implementations the first restricted band channels and the particular channels of the neighboring networks may be channels in the TVWS band and the database may comprise a database of channels in the TVWS band.

At 304 the restricted band channel information is received and stored in network 100. In an example implementation this may be done by storing the restricted band channel information in databases within one or more of network access devices 110-116 and/or server 102. The restricted band channel information on channels of the neighboring networks may then be accessed for use in interference cancellation when the first restricted band channels are used in network 100. In one implementation, at 306, the restricted band channel information on channels of the neighboring networks may also be placed and sent in a beacon signal broadcast by network access devices 110-116 so that the information is available to wireless device 118-128, when the wireless devices are in the coverage of network 100.

Next, at 308, wireless devices 118-128 and network access devices 110-116 utilize the restricted band channel information to initiate interference cancellation when receiving on an affected channel. For example, in the example given for operation 302 in which the restricted band channel information was requested on the basis that a first restricted band channel is currently, or will be used, in network 100 and the database returned information on particular channels of neighbor networks that may interfere with the first restricted band channel or channels, interference cancellation may be initiated based on that returned information. The receiving device may continue performing interference cancellation until an update timer expires. At 310 the update timer is checked. If it is determined, at 310, that the update timer is expired the process returns to 302. The timing of the update timer may be based on the period during which network 100 may use channels in the restricted frequency band. In one implementation in which the restricted frequency band is a TVWS band, the update timer may expire when it is time for network 100 to check with the TVWS database for changes in the identity of the channels of the TVWS band that network 100 is allowed to use. In the case where the identity of the permitted channels changes, this may change the restricted band channel information requested at 302.

Figure 4A:
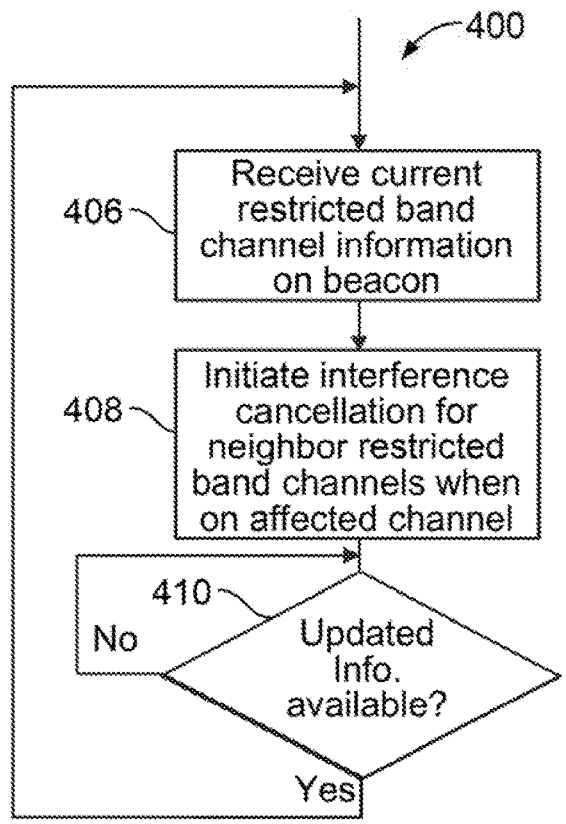
FIG. 4A is a flow diagram illustrating operations performed by an example wireless device operable with a network access device according to FIG. 3.

Referring now to FIG. 4A, therein is a flow diagram 400 illustrating operations performed by an example wireless device performing operations 204 and 206 of FIG. 2. The process of FIG. 4A may be performed, for example, by a wireless device of wireless devices 118-128, configured with appropriate processors or circuitry and program code, in an implementation of network 100 operating according to FIG. 3. At 406 the wireless device receives current restricted band channel information on a beacon signal broadcast from a network access device such as one of access devices 110-116. At 408 the wireless device initiates interference cancellation utilizing the restricted band channel information. For example, when the wireless device is currently using, or will be using a first restricted band channel or channels, interference cancellation may be initiated based on restricted band channel information associated with at least one second restricted band channel received over the beacon, where the at least one second restricted band channel may be used by a neighboring network and potentially interfering. The wireless device may perform interference cancellation until a determination is made at 410 that updated restricted channel information is available. The wireless device may perform the determination at 410 by monitoring beacon signals in network 100. When it is determined that updated restricted channel information is available the process returns to 406 where the updated information is received and the process is repeated to initiate interference cancellation using the updated information.

Figure 4B:
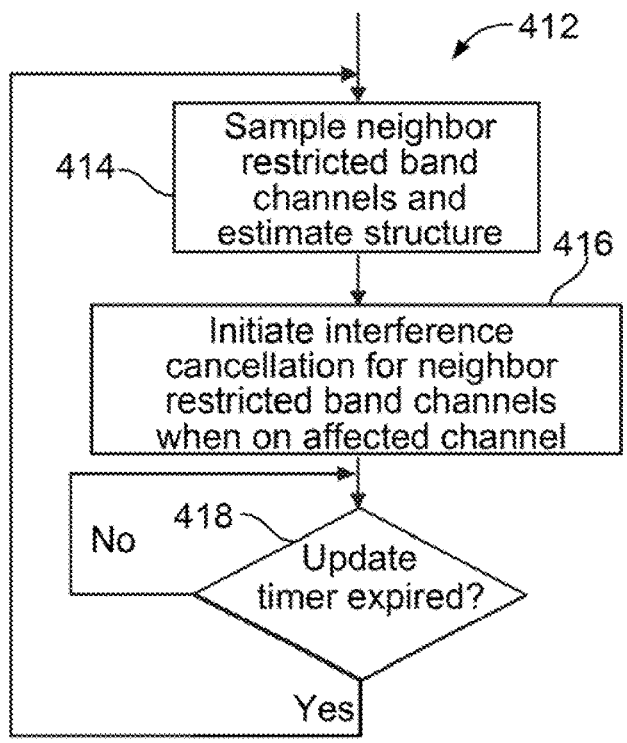
FIG. 4B is a flow diagram illustrating operations performed by a receiving device in another example implementation.

Referring now to FIG. 4B, therein is a flow diagram 412 illustrating operations performed by an example wireless device or network access device operable to receive transmissions on a first channel in a restricted band as a receiving device. The process of FIG. 4B may be utilized as an alternative implementation to FIG. 4A. The process of FIG. 4B may be performed for example by a receiving device of wireless devices 118-128 or of network access devices 110-116 configured with appropriate processors or circuitry, and program code. At 414 the receiving device samples signals and parameters on at least one second restricted band channel that may be used by a neighboring network and potential interfere with reception on the first channel in the restricted band. The receiving device then estimates the channel structure of the at least one second channel using the sampled and measured signals and parameters, and any other available information on the neighboring systems. Next, at 416, the receiving device initiates interference cancellation utilizing the estimated channel structure of the at least one second channel. The receiving device may continue performing interference cancellation until a determination is made at 418 that update timer has expired. The update timer may be set to expire, for example, at time intervals when the at least one second channel used by neighboring systems may change. When it is determined, at 418, that update timer has expired the process returns to 414 where the at least one second channel used by the neighboring systems is again sampled and estimated. The process is then repeated to initiate interference cancellation using the updated sampled and estimated information for the at least one second channel.

Referring now to FIG. 4C, therein is a flow diagram 420 illustrating operations performed by an example wireless device or network access device operable to receive transmissions on a first channel in a restricted band as a receiving device. The process of FIG. 4C may be utilized as an alternative implementation to FIG. 4A. The process of FIG. 4C may be performed, for example, in conjunction with a wireless device of wireless devices 118-128 or in a network access device of network access devices 110-116, configured with appropriate processors or circuitry, and program code, when the device is used as a receiving device on a first channel in a restricted band. The process begins at 422, where information on at least one second restricted band channel is stored in cache memory on the receiving device. The information may be stored in the cache memory upon manufacture, for example when a device is manufactured for a certain service provider, or when a device is activated at a service center or activated by a network manager. The information on the at least one second restricted band channel may be information associated with channels used by neighboring networks that may potentially interfere with reception on the first channel in the restricted band. At 424 the receiving device initiates interference cancellation utilizing the restricted band channel information stored in cache. For example, when the wireless device is currently using or will be using a first restricted band channel or channels, interference cancellation may be initiated based on restricted band channel information associated with at least one second restricted band channel stored in cache memory. The wireless device may continue performing interference cancellation until it is determined at 426 that a cache update timer has expired. The update timer may be set to expire, for example, at time intervals when the at least one second channel used by neighboring systems may change or when the information in the cache is potentially outdated. When it is determined, at 426, that update timer is expired the process returns to 422 where the information on restricted band channels in cache memory of the device is updated. In one example implementation the updating of cache memory may be done over the air. The process is then repeated to initiate interference cancellation using the updated information stored in cache for the at least one second channel.

Referring now to FIG. 5A, therein is a flow diagram illustrating example operations for interference cancellation by joint demodulation which may be performed by the receiving device during operation 206 of FIG. 2. At 502, a signal sn(t) for joint demodulation is determined. The signal sn(t) is determined as the hypothesized desired broadband signal that a wireless network will use on a permitted first channel in a restricted band, for example a TVWS band, plus the sum of at least one second interfering signal from interfering neighboring network 1 through network N. Next, at 504, the noise functions $f$ (Nn(t)), which are power functions of thermal noise (the desired signal+interfering signal 1+ . . . +interfering signal N) are determined. The function $f$(Nn(t)) does not depend on the restricted band, for example TV band, signal structure which is already used in the joint demodulation. Next, at 506, joint coherent demodulation of the desired broadband signals and the restricted band interfering signals is performed to reduce the interference, for example in the TVWS band, on the received signal ro(t) according to the equations:

$$\int_0^\tau ro(t)s1(t)\,dt - f(N1(t))$$

$$\int_0^\tau ro(t)s2(t)\,dt - f(N2(t))$$

$$\int_0^\tau ro(t)sn(t)\,dt - f(Nn(t))$$

Referring now to FIG. 5B, therein is a flow diagram illustrating example operations for interference cancellation by parallel interference cancellation which may be performed by a receiving device during operation 206 of FIG. 2 in one implementation. At 510, the signal sn(t) for interference cancellation is determined. The signal sn(t) is determined as the hypothesized desired broadband signal that a wireless network will use on a permitted first channel in a restricted band, for example the TVWS band. Next at 512, the noise function $f$(Nn(t)) is determined from the interfering signals structure. Next, at 514 parallel interference cancellation is performed using the broadband signals sn(t) and $f$(Nn(t)) to reduce the interference in the restricted channel band, for example the TVWS band, on its received signal ro(t) according to the equations:

$$\int_0^\tau ro(t)s1(t)\,dt - f(N1(t))$$

$$\int_0^\tau ro(t)s2(t)\,dt - f(N2(t))$$

$$\int_0^\tau ro(t)sn(t)\,dt - f(Nn(t))$$

Referring now to FIG. 6, therein is a simplified block diagram of an example wireless device 600 which may be implemented to perform operations according to FIGS. 2 and 4A-4C. Wireless device 600 represents a possible implementation of any of wireless devices 118-128 or any other device that may operate in network 100, according to the embodiments of the disclosure. Client device 600 may include user interfaces (UIs) 618 which may include any type of interface, for example, a touch screen/keypad, microphone, speaker or camera which receive inputs and provide outputs to and from device 600. Client device 600 may also include other input/outputs (Other I/O) 616 for providing interface to other type devices. Other I/O 616 may include, for example, interfaces for any function that may transmit and receive data in network 100. Device 600 includes processor 614 and memory 620 which is shown as including program code for restricted band neighbor channel information database 626. Memory 620 also includes restricted band interference cancellation programs 628 that comprise code or instructions for executing operation according to FIGS. 22 and 4A-4C. In an implementation the restricted band may comprise a TVWS band. Memory 620 may also include other device applications 624. Memory 620 also includes OS programs 622 in the form of code for running the operating system to control the operations of device 600 and application programs 624. Memory 620 also may include data such as media data, camera photos and videos, contact data, calendar data, and other files used in the operation of applications on device. Processor 614 provides overall control of client device 600 and the other functional blocks shown in FIG. 6 by implementing instructions and code in memory 620 to provide functions for operation according to disclosed embodiments. Processing unit 614 may comprise one or more processors, or other control circuitry or any combination of processors and control circuitry. Memory 620 may be implemented as any type of computer readable storage media in client device 600, including non-volatile and volatile memory Client device 600 includes transceivers (TRXs) operating in different example frequency bands as shown by 60 GHz Band TRX 602, 2.4 GHz TRX 604, 5 GHx Band TRX 606, 300 MHz Band TRX 608, TVWS Band TRX 610, and cellular band TRX 612. In the embodiments device 600 and its transceivers may be operable to use one or more spectrum allocations that are allowed in each of the designated frequency bands according to the any relevant IEEE 802.11 or any other standard specifications supported by network 100. Also, TRX 610 may use currently available in the restricted television band portion comprising TVWS channels according to requirements and regulations of the geographic area in which network 100 operates. Cellular band TRX 612 may allow device 400 to operate in a cellular system In the embodiments, execution of restricted band interference cancellation programs 628 causes processor 614 to implement operations that cause functions of client device 600 to perform the operations shown in FIG. 2 when receiving on a channel in a restricted frequency band. In performing the operations of FIG. 2, restricted band interference cancellation programs 628 may cause wireless device 600 to perform appropriate operations utilizing restricted band channel information database 626 according to the implementation of FIG. 4A, 4B, or 4C, depending on the configuration of restricted channel information database 626. For example, restricted band channel information database 626 may store information received on a beacon signal for use by wireless device 600 in operations 406 of FIG. 4A, or, alternately, restricted band channel information database 626 may be configured as a database stored in cache memory, for example, for use by wireless device 600 in operation 422 of FIG. 4C. In another alternative implementation, restricted band channel information database 626 may store information utilized by wireless device 600 in performing, and storing the results of, operation 414 of FIG. 4C.

Referring now to FIG. 7, therein is a simplified block diagram of an example network access device 700 which may be implemented in the network 100 to perform operations according to FIGS. 2 and 4A-4C. Also, in another example implementation network access device may also perform operations according to FIG. 3. One or more of network access devices 110-116 of network 100 may be implemented according to FIG. 7. Network access device 700 includes processor 704, transceivers 712, and memory/storage 706 that includes code and instructions for restricted band interference programs 710 and restricted band channel information database 708. In an implementation the restricted band may comprise a TVWS band. Memory 706 may be implemented as any type of computer readable storage media, including non-volatile and volatile memory. Network access device 700 connects to a backend network over interface 702. Processor 704 may comprise one or more processors, or other control circuitry or any combination of processors and control circuitry that provide overall control of the access point according to the disclosed embodiments. Transceivers 712 provide the capability for network 100 to communicate with devices, such as devices. 118-128, over RF channels according to protocols defined by relevant standards. In an implementation, network access device 700 is operable to communicate with wireless devices 118-128 over the wireless interfaces supported by any of the transceivers implemented in device 600 of FIG. 6, including TVWS band TRX 610

In the embodiments, execution of restricted band interference programs 710 may cause processing unit 704 to implement operations that cause functions of network access device 700 to perform the operations shown in FIG. 2 when network access device 700 is receiving on channels in a restricted frequency band. In performing the operations of FIG. 2, restricted band interference cancellation programs 710 may cause network access device 700 to perform appropriate operations utilizing restricted band channel information database 708 according to the implementation of FIG. 3 and FIG. 4B or 4C, depending on the configuration of restricted channel information database 708 and depending on the configuration of wireless devices operating in network 100. For example, network access device 700 may transmit restricted channel information to wireless devices 118-128 on a beacon signal when wireless device is operating according to FIG. 4A. Restricted band channel information database 708 may be configured as a database stored in cache memory of network access device 700, for example, for use by network access device 700 in operation 422 of FIG. 4C. In another alternative implementation, restricted band channel information database 708 may store information utilized by network access device 700 in performing, and storing the results of, operation 414 of FIG. 4C.

In other example implementations execution of restricted band interference programs 710 may cause processor 704 to control network access device 700 to perform the sampling of restricted band channels and estimation of restricted channel structures, as described for operation 414 of FIG. 4B, for use in interference cancellation. The estimated channel structures may then be sent to wireless devices or network access devices for utilization in the embodiments.

Referring now to FIG. 8, therein is a simplified block diagram of an example server device 800 which may be utilized in association with some implementations of network 100 to perform operations according to FIGS. 2 and 3. For example, controller 102 of FIG. 1 may be implemented according to controller 800 of FIG. 8. Server device 800 may include a server 804 having processing unit 806, a memory 814, network interfaces 808, and data center interfaces 802. Memory 814 may be implemented as any type of computer readable storage media, including non-volatile and volatile memory. Memory 814 is shown as including restricted band channel location/information database 812. In an implementation the restricted band may comprise a TVWS band. Server 804 and processing unit 806 may comprise one or more processors, or other control circuitry, or any combination of processors and control circuitry that provide overall control of server device 800 according to the disclosed embodiments.

Server device 800 may be utilized to store restricted band channel location-information database 812 for access by network access device 110-116 or wireless devices 118-128 as necessary. In alternative implementations of network 100, restricted band channel location-information database may be used to store a portion, or all of the information, that may be utilized by restricted band interference cancellation programs 628 and 710 of FIGS. 6 and 7, respectively, in performing operations of FIGS. 2, 3 and 4A-4B. Restricted band channel location-information database 812 of server device 800 may also comprise location related information about interfering restricted band channels. The location information, when accessed, would allow wireless device 118-128 and network access device 110-116 to have knowledge of particular restricted band channels of other networks, such as networks 160, 162 and 164, that may interfere when restricted channels are used in a particular location of network 100. Wireless device 118-128 and network access device 110-116 may use the location related information in performing operations of FIGS. 2, 3 and 4A-4B when determining parameters for interference cancellation by identifying particular interfering channels to consider in the processes.

Server device 800 may also be configured to provide an interface 802 to a channel data center, such as channel data center 130 of FIG. 1. Server device 800 may access channel data center 130 in order to maintain and update a list of restricted band channels that are currently permitted to be used by network 100. In an implementation channel data center 130 may be a TVWS database serving a geographic region in which network 100 is located. Controller 800 may access data center 130 through data center interfaces 802 and communicate with network access devices 110-116 through network interfaces 808. Network access devices 110-116 may then relay information to wireless devices 118-128. In another implementation functions of server device 800 may be incorporated into channel data center 130.

Server device 800 is shown as including server 804 as a single server. However, server 804 may be representative of server functions or server systems provided by one or more servers or computing devices that may be co-located or geographically dispersed to implement server device 800. The term server as used in this disclosure is used generally to include any computing devices or communications equipment that maybe implemented to perform the adaptive profile control programs functions and processes.

The example embodiments disclosed herein may be described in the general context of processor-executable code or instructions stored on memory that may comprise one or more computer readable storage media (e.g., tangible non-transitory computer-readable storage media such as memory 620, 706 or 814). As should be readily understood, the terms "computer-readable storage media" or "non-transitory computer-readable media" include the media for storing of data, code and program instructions, such as memory 620, 706 or 814, and do not include portions of the media for storing transitory propagated or modulated data communication signals.

While implementations have been disclosed and described as having functions implemented on particular network access devices, server devices, and/or wireless devices operating in a network, one or more of the described functions for the devices may be moved between the devices and implemented on a different one of the devices than shown in the figures, or on different types of equipment.

Embodiments for restricted frequency band cancellation have been disclosed that include a device comprising one or more processor and memory in communication with the processor. The memory contains code that, when executed, causes the one or more processors to determine a first channel to be used when operating in a first network, the first channel in a restricted frequency band, determine at least one parameter, the at least one parameter associated with at least one second channel used by one or more second networks, the at least one second channel in the restricted frequency band, and, initiate interference cancellation based at least on the at least one parameter when using the first channel in the first network. The code may be further executable to cause the one or more processors to determine the at least one parameter by causing the one or more processors to access a database, the database comprising information on the at least one second channel used by the one or more second networks, and, determine the at least one parameter from the information on the at least one second channel. The code may be further executable to cause the one or more processors to access the database by causing the one or more processors to receive the information on the at least one second channel used by the one or more second networks from the first network on a beacon signal. The code may be further executable to cause the one or more processors to access the database by causing the one or more processors to retrieve the information on the at least one second channel used by the one or more second networks from a memory, wherein the information was stored in the memory prior to the device initiating communications with the first network. The code may be still further executable to cause the one or more processors to determine the at least one parameter by causing the one or more processors to sample the at least one second channel and estimate the at least one parameter.

In further embodiments the device may include code further executable to cause the one or more processors to initiate interference cancellation by causing the one or more processors to initiate joint demodulation based at least on the at least one parameter The joint demodulation may be initiated over a desired signal of the first network on the first channel plus the sum of interfering signals on the at least one second channel from the one or more second networks. The code may also include code further executable to cause the one or more processors to initiate interference cancellation by causing the one or more processors to initiate parallel interference cancellation based at least on the at least one parameter. The parallel interference cancellation may be initiated using a desired signal of the first network on the first channel and a noise function that depends on interfering signals on the at least one second channel from the one or more second networks. The first channel and the at least one second channel may be channels on frequencies in a television white space frequency band. Also, the at least one parameter may comprise a channel structure of the at least one second channel. The first channel may comprise a channel in a restricted frequency band, wherein the first channel is permitted to be used in the first network according to restrictions, and wherein the at least one second channel comprises at least one second channel in the restricted frequency band used by one or more second networks not governed by the restrictions. Alternately, the first channel is permitted to be used in the first network and the at least one second channel is permitted to be used by one or more second networks according to restrictions.

The disclosed embodiments also include a method comprising determining a first channel to be used by a device when operating in a first network, the first channel in a restricted frequency band, determining at least one parameter, the at least one parameter associated with at least one second channel used by one or more second networks, the at least one second channel in the restricted frequency band, and, initiating interference cancellation at the device based at least on the at least one parameter when using the first channel in the first network. The determining the at least one parameter may comprise receiving information at the device from the first network on a beacon signal, the information associated with the at least one second channel used by the one or more second networks, and, determining the at least one parameter from the information. The determining the at least one parameter may comprise retrieving information associated with the at least one second channel used by the one or more second networks from a memory on the device, wherein the information was stored in the memory prior to the device initiating communications with the first network, and, determining the at least one parameter from the information. The determining the at least one parameter may comprise sampling the at least one second channel at the device and estimating the at least one parameter. The initiating interference cancellation may comprise initiating joint demodulation at the device over a desired signal of the first network on the first channel plus a sum of interfering signals on the at least one second channel from the one or more second networks. Alternately, the initiating interference cancellation may comprise initiating parallel interference cancellation at the device using a desired signal of the first network on the first channel and a noise function that depends on at least one interfering signal on the at least one second channel generated from the one or more second networks.

The disclosed embodiments further included a device configured to receive transmissions from a first network on a first channel in a restricted frequency band when use of the first channel is permitted in the first network, the device configured to perform interference cancellation for interference caused by at least one second channel used by a second network in the restricted frequency band by determining at least one parameter associated with at least one second channel and initiating interference cancellation based at least on the at least one parameter when using the first channel.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device comprising:
    one or more processors; and
    memory in communication with the one or more processors, the memory comprising code that, when executed, causes the one or more processors to:
        determine a first channel to be used when operating in a first network, wherein the first channel is in a restricted frequency band;
        sample at least one second channel used by one or more second networks, wherein the at least one second channel is in the restricted frequency band;
        estimate a channel parameter associated with the at least one second channel;
        select a first interference cancellation technique or a second interference cancellation technique based at least in part on the estimated channel parameter associated with the at least one second channel, wherein the first interference cancellation technique or the second interference cancellation technique is selected from among a plurality of potential interference cancellation techniques;
        initiate interference cancellation in accordance with the selected interference cancellation technique when using the first channel in the first network for a predetermined period of time;
        estimate the channel parameter at the end of the predetermined period of time;
        re-select the first interference cancellation technique or the second interference cancellation technique based on the estimated channel parameter at the end of the predetermined period of time; and
        initiate the re-selected first interference cancellation technique or the second interference cancellation technique when using the first channel in the first network.

2. The device of claim 1, wherein the code is further executable to cause the one or more processors to determine at least one parameter associated with the at least one second channel by causing the one or more processors to:
    access a database, the database comprising information on the at least one second channel used by the one or more second networks; and
    determine the at least one parameter from the information on the at least one second channel.

3. The device of claim 2, wherein the code is further executable to cause the one or more processors to access the database by causing the one or more processors to:
    receive the information on the at least one second channel used by the one or more second networks from the first network on a beacon signal.

4. The device of claim 2, wherein the code is further executable to cause the one or more processors to access the database by causing the one or more processors to:
    retrieve the information on the at least one second channel used by the one or more second networks from a second memory, wherein the information was stored in the second memory prior to the device initiating communications with the first network.

5. The device of claim 1, wherein the first interference cancellation technique comprises joint demodulation, and wherein initiating the interference cancellation comprises initiating joint demodulation over a desired signal of the first network on the first channel plus a sum of interfering signals on the at least one second channel from the one or more second networks.

6. The device of claim 1, wherein the first interference cancellation technique comprises parallel interference cancellation.

7. The device of claim 6, wherein initiating the interference cancellation comprises initiating parallel interference cancellation using a desired signal of the first network on the first channel and a noise function that depends on interfering signals on the at least one second channel from the one or more second networks.

8. The device of claim 1, wherein the first channel and the at least one second channel are channels on frequencies in a television white space frequency band.

9. The device of claim 1, wherein the first channel is permitted to be used in the first network by permission of an authority, and wherein the at least one second channel comprises at least one channel in the restricted frequency band used by one or more second networks not governed by the authority.

10. The device of claim 1, wherein the first channel is permitted to be used in the first network and the at least one second channel is permitted to be used by one or more second networks by permission of an authority.

11. A method comprising:
    determining a first channel to be used by a device when operating in a first network, wherein the first channel is in a restricted frequency band;
    sampling at least one second channel used by one or more second networks, wherein the at least one second channel is in the restricted frequency band;
    estimating a channel parameter associated with the at least one second channel;
    selecting a first interference cancellation technique or a second interference cancellation technique based at least in part on the estimated channel parameter associated with the at least one second channel, wherein the first interference cancellation technique or the second interference cancellation technique is selected from among a plurality of potential interference cancellation techniques;

initiating interference cancellation joint in accordance with the selected interference cancellation technique when using the first channel in the first network for a predetermined period of time;

estimate the channel parameter at the end of the predetermined period of time;

re-select the first interference cancellation technique or the second interference cancellation technique based on the estimated channel parameter at the end of the predetermined period of time; and initiate the re-selected first interference cancellation technique or the second interference cancellation technique when using the first channel in the first network.

12. The method of claim 11, further comprising:

receiving information at the device from the first network on a beacon signal, the information associated with the at least one second channel used by the one or more second networks; and determining at least one parameter associated with the at least one second channel from the information.

13. A device configured to receive transmissions from a first network on a first channel in a restricted frequency band when use of the first channel is permitted in the first network, the device configured to perform interference cancellation for interference caused by at least one second channel used by a second network in the restricted frequency band by:

sampling the at least one second channel;

estimating a channel parameter associated with the at least one second channel;

selecting a first interference cancellation technique or a second interference cancellation technique based at least in part on the estimated channel parameter associated with the at least one second channel, wherein the first interference cancellation technique or the second interference cancellation technique is selected from among a plurality of potential interference cancellation techniques;

initiating interference cancellation in accordance with the selected interference cancellation technique when using the first channel for a predetermined period of time;

estimating the channel parameter at the end of the predetermined period of time;

re-selecting the first interference cancellation technique or the second interference cancellation technique based on the estimated channel parameter at the end of the predetermined period of time; and initiating the re-selected first interference cancellation technique or the second interference cancellation technique when using the first channel in the first network.

14. The device of claim 13 wherein the restricted frequency band is a television white space band.

15. The device of claim 14 wherein the first network is a Wi-Fi network.

16. The device of claim 15 wherein the second network is a television broadcast network.

17. The device of claim 16 wherein the use of the first channel is permitted in the first network by a governing entity and the second network is outside a jurisdiction of the governing entity.

\* \* \* \* \*